Aug. 17, 1965

D. H. CHUNG ETAL 3,201,608

FEEDBACK CONDITIONED COINCIDENT PULSE RESPONSIVE BISTABLE CIRCUITS

Filed Dec. 28, 1962

2 Sheets-Sheet 1

INVENTORS
DAVID H. CHUNG
PHILIP M. MARINO

BY David N. Koffsky

ATTORNEY 3,201,608

FEEDBACK CONDITIONED COINCIDENT PULSE RESPONSIVE BISTABLE CIRCUITS

David H. Chung and Philip M. Marino, Poughkeepsie, N.Y., assignors to International Business Machines Corporation, New York, N.Y., a corporation of New York Filed Dec. 28, 1962, Ser. No. 247,971
8 Claims. (Cl. 307—88.5)

This invention relates to binary trigger circuits and more particularly to extremely fast binary trigger circuits having a minimum number of components.

As is well known, the major objective of good circuit design is to achieve the desired circuit function with the least possible number of components and resulting lowest cost. With the ever increasing speed requirements for modern data processing systems, the requirements of minimum cost and minimum number of components have been, to some extent, sacrificed to achieve the desired speed goals. Thus, while the speed requirements have been met, the resulting circuits have been somewhat more complex and costly than their slower and simpler ancestors.

The aforementioned evolution has been especially evident in the bistable trigger family. A trigger circuit in a data processing system may perform two major functions—the first function is its use as a short term storage element and the second function is its use as a data deskewing element, that is, an element capable of receiving a data pulse which is out of synchronism with the computer's clocking system and forcing it back into synchronism within one clock cycle. There are many types of triggers, two of which are most important in the data processing art. First there is the set-reset trigger (of which the Eccles-Jordan is one type) where both sides of the trigger must be sequentially triggered to complete one cycle. This type of trigger is relatively inflexible in its operation in that it is asynchronous, must be continually cleared by distinct reset pulses and it will not, of itself, perform a deskewing operation but it does involve rather simple circuitry and is therefore inexpensive. Second, there is the coincidence type bistable trigger wherein a data pulse is stored only when received in coincidence with a clock pulse, and is subsequently read out and the trigger reset by a subsequent clock pulse. While this type of trigger is useful for computer operations, it is more complex than the set-reset trigger. Several versions of such triggers are described in copending U.S. patent application Serial No. 219,929 to Buelow et al., assigned to the same assignee as is this application. In such circuits the delay per logical decision is in the order of 1–2 nanoseconds. However, this speed is achieved at the cost of at least six transistors and a pair of tunnel diodes.

Accordingly, it is an object of this invention to provide improved coincidence type bistable triggers.

It is another object to provide fast coincidence type bistable triggers utilizing fewer active elements than have heretofore been used.

A further object of this invention is to provide a less expensive coincidence type bistable trigger which nevertheless retains the performance characteristics of more expensive triggers.

In accordance with the above objects, bistable means are provided which produce a high voltage output in response to a first input and a low voltage output in response to a second input. A clock circuit and a data circuit provide inputs for the bistable means. Coupling the data circuit and clock circuits to the bistable means is a control circuit which comprises a single active device which is conditioned by the voltage state of the bistable means. Upon the simultaneous appearance of a data signal and a clock signal when the bistable means is producing its low voltage output, the control circuit produces a first input to the bistable means causing it to assume its high voltage. The high voltage state produced by the bistable means is fed back and conditions the control circuit to produce its second output in response to the appearance of the next clock pulse. The second output impulses the bistable means and causes it to revert to its low voltage state.

In one embodiment, the control circuit includes a normally conductive unidirectional device in combination with a signal translating means responsive to a clock input. The signal translating means acts to cause the unidirectional device to cease conduction and thereby produces an output upon the appearance of a clock pulse, if and only if, the bistable means is in its low voltage state.

In a further embodiment, the control circuit includes a signal translating device whose conduction state is controlled by a coincidence of inputs from the data and clock circuits when a certain feedback is manifested from the bistable means.

The foregoing and other objects, features and advantages of the invention will be apparent from the following more particular description of the preferred embodiments of the invention as illustrated in the accompanying drawings.

Figures 1, 2, 3:
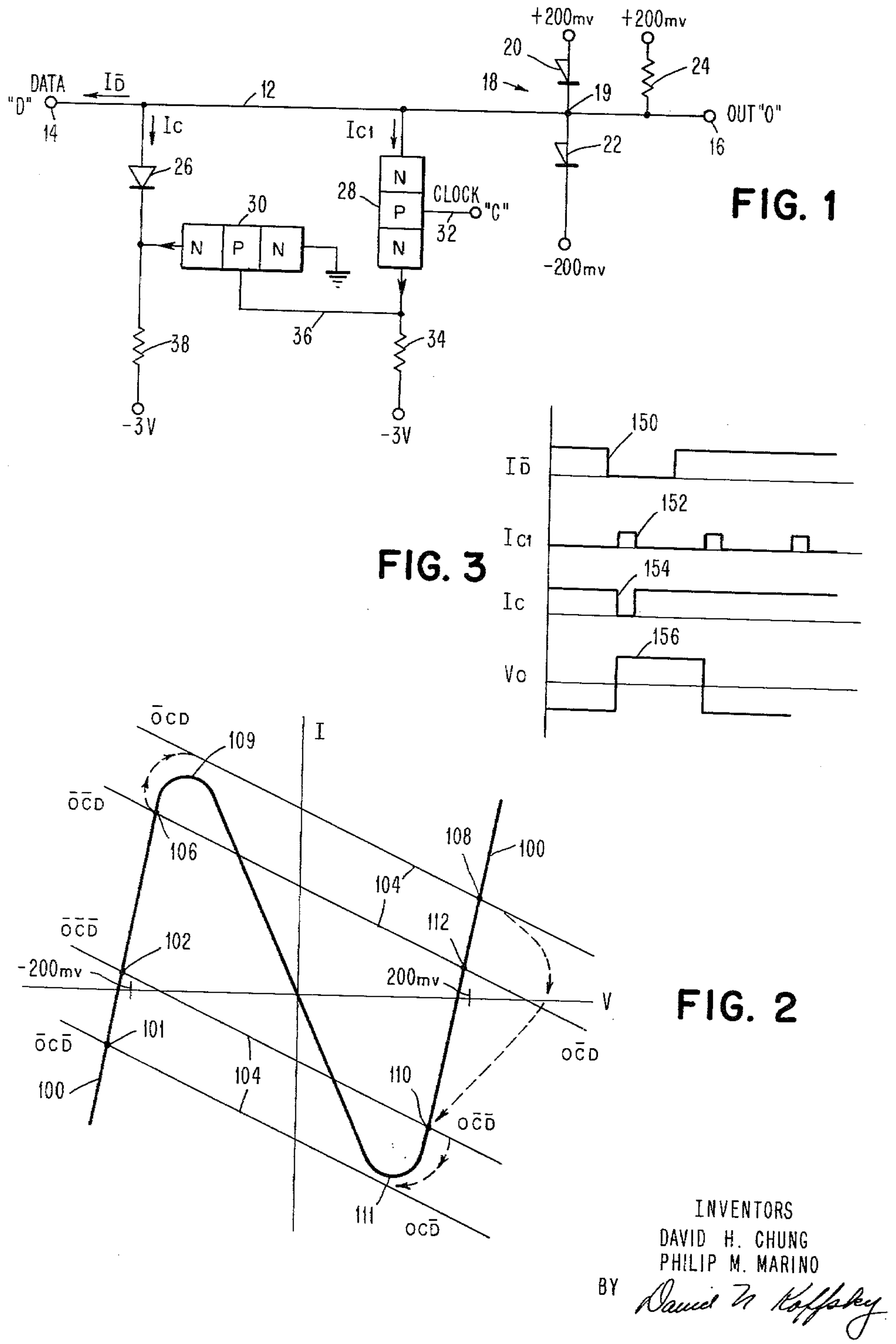
FIG. 1 is a circuit diagram of one embodiment of the invention.
FIG. 2 is a diagram showing the relationship between the composite characteristic curve of a bistable tunnel diode pair and various load lines which occur in the operation of the circuits of FIGS. 1 and 4.
FIG. 3 is a waveform digram showing the relative time occurrences of waveforms in the circuit of FIG. 1.

Referring now to the bistable trigger shown in FIG. 1, conductor 12 forms the central data transmission and feedback paths for the circuit. One end of conductor 12 provides data (D) input terminal 14 and the other end, the output (O) terminal 16. Bistable characteristics are imparted to the circuit by tunnel diode pair 18 which includes tunnel diodes 20 and 22. Tunnel diodes 20 and 22 are connected cathode and anode to conductor 12 at node 19 with their respective anode and cathode electrodes being connected to +200 and —200 millivolt (mv.) supplies. Another 200 mv. supply is connected through resistor 24 to conductor 12. This circuit is described by Sims et al. in "A Survey of Tunnel Diode Digital Techniques," at page 145 in the Proceedings of the IRE, January 1961.

The combination of tunnel diode pair 18, resistor 24 and its associated 200 mv. supply forms a bistable circuit with a composite characteristic curve 100 and load line 104 as indicated in FIG. 2. FIG. 2 is a plot of voltage variations of tunnel diode pair 18 as a result of current changes at node 19. Basically, resistor 24 establishes the slope of load line 104 in relation to composite characteristic curve 100 of tunnel diode pair 18. Then, dependent upon the sense of the current flowing into or out of node 19 the position of load line 104 is caused to move upwardly or downwardly in relation to composite characteristic curve 100. The operation of tunnel diode pair 18 will be described in greater detail hereinafter.

The circuitry which controls the sense of current flow into or out of node 19 includes diode 26, clock input transistor 28 and transistor 30. Clock input pulses (C) are applied to conductor 32 which in turn forms the base electrode of transistor 28. While transistor 28 is of the NPN variety (as well as all the rest of the transistors shown in FIGS. 1 and 4), it should be obvious to one skilled in the art that opposite conductivity types, i.e., PNP, could be utilized with appropriate changes in voltage levels and supplies.

The collector of transistor 28 is connected to conductor 12 while its emitter is connected through resistor 34 to a −3 volt supply. The emitter circuit of transistor 28 is also connected through conductor 36 to the base of transistor 30. The conduction state of transistor 30 is thereby controlled by the conduction state of transistor 28. The collector of transistor 30 is connected to ground while its emitter is connected to a point between the cathode of diode 26 and resistor 38. The anode of diode 26 is connected to conductor 12 and its cathode is connected through resistor 38 to a −3 volt supply.

With reference now to both FIGS. 1 and 2, the quiescent state of the trigger manifests itself when there is neither a data input ($\overline{D}$) nor a clock input ($\overline{C}$) and the output is in its low voltage state ($\overline{O}$). Under these conditions, a current ($I_{\overline{D}}$) flows out of data input terminal 14 manifesting the fact that no data signal ($\overline{D}$) is present. This current as well as $I_{C1}$ and $I_C$ is supplied through resistor 24 from the 200 mv. supply. Due to the fact that no clock pulse is present at the base 32 of transistor 28, a negative level is applied thereto which back-biases its emitter base junction thereby rendering it nonconductive. With transistor 28 nonconductive, the base voltage appearing on conductor 36 is sufficient to back-bias the emitter-base junction of transistor 30 thereby rendering it nonconductive also. The nonconduction of transistor 30 causes the potential at the cathode of diode 26 to be at nearly −3 v. which renders it conductive thereby allowing $I_C$ to flow. The combined current drains of $I_C$ and $I_{\overline{D}}$ from node 19 are sufficient to maintain the output voltage at output terminal 16 at the low voltage level (−200 mv.). That is, tunnel diode 20 is in its high resistance state and tunnel diode 22 is in its low resistance state thereby manifesting the −200 mv. voltage on conductor 12. This condition is illustrated in FIG. 2 by intersection point 102 $\overline{OCD}$ between load line 104 and composite characteristic curve 100.

With reference now to FIG. 3, there is shown a chart of the waveforms occurring in the circuit of FIG. 1 at various times during its operation. Waveforms 150 and 152 are current waveforms of the data and clock signals as manifested respectively at terminal 14 and in the collector circuit of transistor 28. Waveform 154 shows the reaction of the current through diode 26 ($I_C$) to a clock pulse input. Waveform 156 shows the output voltage excursions at terminal 16 in response to the aforementioned inputs.

Assume now, as shown by waveform 150 in FIG. 3, that a data pulse manifests itself at data input terminal 14. This phenomenon is manifested by a cessation of $I_{\overline{D}}$. The current increment which previously comprised $I_{\overline{D}}$ is now diverted into node 19. This action causes load line 104 to shift upwardly (FIG. 2) with respect to composite characteristic curve 100 with its final intersection point being indicated at 106. The current $I_{\overline{D}}$ is preset to such a value that it is insufficient, when diverted into node 19, to cause tunnel diodes 20 and 22 to switch their stable states. Thus, load line 104 is merely caused to move upwardly upon the receipt of a data pulse with no resultant switching action. If, however, the occurrence of a data manifestation is accompanied by a clock input pulse on line 32 (as indicated in FIG. 3 by waveform 152), transistor 28 is rendered conductive and current $I_{C1}$ flows therethrough. Upon becoming conductive, the emitter voltage of transistor 28 (and thus the voltage on conductor 36) tends to rise towards its collector potential with the result being that transistor 30 is rendered conductive. The conduction of transistor 30 raises the cathode potential of diode 26 towards ground. Since the anode potential of diode 26 is near −200 mv. due to the fact that tunnel diode 22 is in its low resistance state, diode 26 is back-biased and $I_C$ ceases to flow as indicated by waveform 154 in FIG. 3. With no other path for $I_C$ to travel except through tunnel diode 22, it, in addition to $I_{\overline{D}}$, is sufficient to exceed the peak switching current 109 needed to cause tunnel diode pair 18 to switch to its high voltage state. In other words, tunnel diode 20 switches from its high to low resistance state and tunnel diode 22 switches from its low to high resistance state. This is illustrated in FIG. 2 by intersection point 108 (OCD) occurring between load line 104 and composite characteristic 100. Resulting from this action, the voltage at terminal 16 rises from −200 mv. to +200 mv. as shown in waveform 156 in FIG. 3 and represents the coincidence of the data and clock inputs to the trigger circuits.

Upon the cessation of the data and clock inputs ($O\overline{CD}$), $I_{\overline{D}}$ resumes and transistors 28 and 30 become nonconductive allowing current $I_C$ through diode 26 to resume. This causes load line 104 in FIG. 2 to move downwardly on composite characteristic 100 to intersection point 110 ($O\overline{CD}$) illustrating that instead of their being a positive current flow into node 19, there is a substantial current flow out of node 19 but that it is insufficient to exceed the value 111 needed to switch tunnel diode pair 18 back into its low voltage state. At this point, it should be remembered that there is a +200 mv. level on conductor 12 which manifests itself at the anode of diode 26. Should a data pulse unaccompanied by a clock pulse now occur, the result is that load line 104 merely shifts upwardly to intersection point 112 ($O\overline{C}D$) with no resultant shift in output voltage.

If there should now be received at clock input terminal 32 a clock pulse unaccompanied by a data manifestation at terminal 14, the trigger resets itself. The clock input on line 32 renders transistor 28 conductive which in turn renders transistor 30 conductive. The emitter potential of transistor 30 rises towards ground. Since, however, the anode potential of diode 26 is at +200 mv., the potential at its cathode due to the conduction of transistor 30 is insufficient to cause it to cease conduction. For this reason, current $I_C$ continues to flow. This action results in there being three simultaneous current drains from node 19, i.e., $I_{\overline{D}}$, $I_C$ and $I_{C1}$. While $I_{C1}$ is of smaller magnitude than either $I_C$ or $I_{\overline{D}}$, it is sufficient in this case to cause load line 104 to shift downwardly past the negative current peak 111 to cause tunnel diode pair 18 to shift to its low voltage state. Thus, tunnel diode 20 reverts to its high resistance state and tunnel diode 22 to its low resistance state, thereby causing the −200 mv. voltage to be again manifested on conductor 12.

In summary, to set tunnel diode pair 18 to its high voltage state, e.g., +200 mv., both $I_{\overline{D}}$ and $I_C$ must be blocked and diverted into node 19. To cause tunnel diode pair 18 to revert from its high voltage to low voltage state, not only must $I_{\overline{D}}$ and $I_C$ currents flow, but also $I_{C1}$ is needed to cause the current drain from node 19 to exceed negative current switching level 111.

Figure 4:
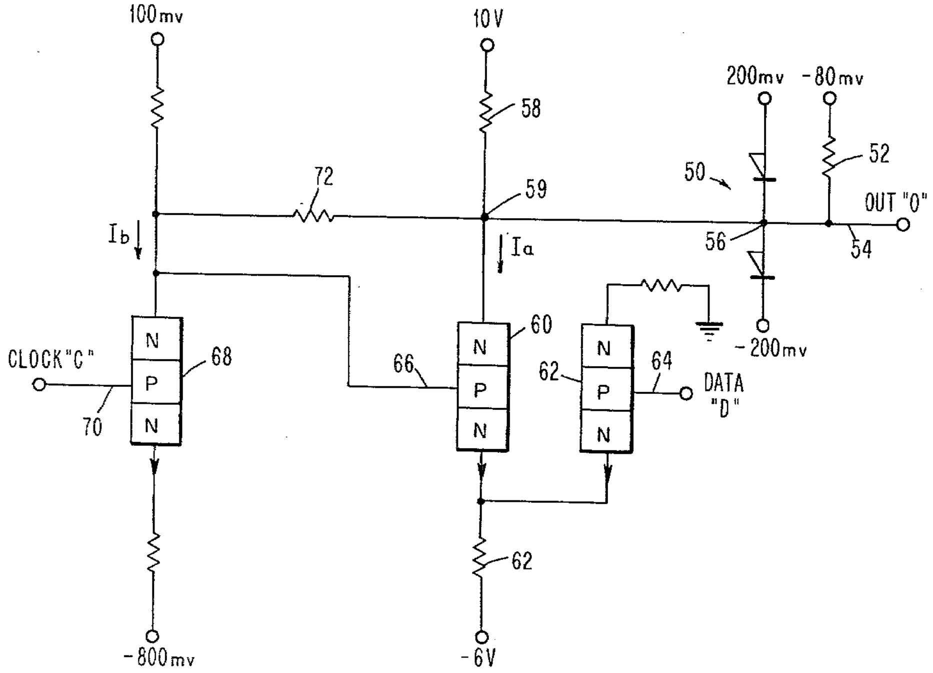
FIG. 4 is a circuit diagram showing a further embodiment of the invention.

Referring now to FIG. 4, there is shown an alternative bistable trigger circuit which provides for similar load line shifting with respect to the composite tunnel diode characteristic as shown in FIG. 2. In this circuit, tunnel diode pair 50 and resistor 52 are substantially identical to that shown in FIG. 1, with the exception that the voltage supply connected to resistor 52 is −80 mv. This circuit change is necessitated merely for circuit design reasons and does not alter the basic operation of the trigger circuits.

Again, as in FIG. 1, the sense of current flow into or out of node 56 controls the stable state of tunnel diode pair 50. High resistance 58 and its associated 10 volt supply form a constant current supply which provides the current necessary to operate tunnel diode pair 50. The current which flows out of resistor 58 and into node 59 generally flows through normally conductive transistor 60 and resistor 62 to a −6 volt supply. Connected to the emitter of transistor 60 is a data input emitter follower circuit which includes transistor 62. Transistor 62 is normally nonconductive until a data input pulse is applied to its base electrode 64.

The potential on base conductor 66 of transistor 60 is controlled by two factors: first by the conductivity state of clock input transistor 68 to whose base conductor 70 are applied clocking pulses and second by the output voltage manifested by tunnel diode pair 50 as reflected back through resistor 72 to the collector circuit of transistor 68.

Figure 5:
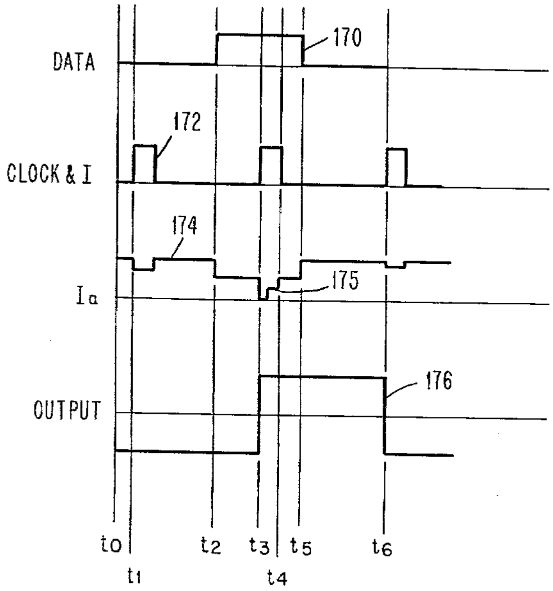
FIG. 5 is a waveform diagram showing the relative time occurrences of waveforms in the circuit of FIG. 4.

Referring now to FIG. 5, there is shown a plot of the various waveforms which occur in the circuit of FIG. 4. Waveforms 170 and 172 are respectively the data and clock input pulses as applied to terminals 64 and 70, respectively. Waveform 174 is a plot of variations in the current ($I_a$) which flows through transistor 60 in response to the clock and data inputs. Waveform 176 shows changes in the output voltage in response to the data and clock inputs.

The operation of the circuit of FIG. 4 will now be explained with respect to the waveform diagram of FIG. 5 at discrete times $t_0$–$t_6$ and also with relation to the composite tunnel diode curve 100 and load line 104 as shown in FIG. 2.

Initially, ($t_0$) the voltage at output terminal 54 is low (−200 mv.); there is no clock input and transistor 68 is nonconductive, and there is no data input and transistor 62 is nonconductive. Transistor 60, however, is conductive and $I_a$ flows, thereby tending to divert the current supplied by resistor 58 to the −6 volt supply. At $t_1$, a clock pulse 172 appears at clock input terminal 70 and renders transistor 68 conductive thereby allowing $I_b$ to flow. This results in the base voltage of transistor 60 falling towards −800 mv. volts. However, this fall is insufficient to cut off transistor 60 since its emitter voltage is at −6 volts and its emitter base junction remains forward biased. $I_a$ therefore continues to flow (waveform 152 FIG. 5), but in a slightly diminished amount. This condition is shown in FIG. 2 by the intersection point 101 ($\overline{O}C\overline{D}$).

At time $t_2$, data pulse 170 appears at input terminal 64 and renders transistor 62 conductive. The conduction of transistor 62 causes the emitter potential of transistor 60 to rise towards ground. However, due to the fact that transistor 68 is now nonconductive, the potential on base conductor 66 is somewhat more positive than ground and the conduction state of transistor 60 remains unaffected except for a small abatement in $I_a$. This abatement in $I_a$ is reflected in a somewhat greater current flow into node 56 of tunnel diode pair 50. This can be seen in FIG. 2 by realizing that load line 104 which previously intersected composite characteristic curve 100 at point 101 now intersects curve 100 at point 106 ($\overline{O}CD$) thereby indicating the greater amount of current flow into node 56.

At $t_3$, both clock pulse 172 and data pulse 170 are simultaneously present and transistors 68 and 62 are both conductive. The conduction of transistor 62, as aforementioned, raises the emitter potential of transistor 60 while the conduction of transistor 68 causes the base potential of transistor 60 to fall. At this time, and only at this time, does the potential on base conductor 66 come more negative than the emitter potential of transistor 60 with the result being that transistor 60 becomes nonconductive and $I_a$ ceases. Thus, the current into node 56 increase by an amount proportional to the decrease in $I_a$ and, as can be seen in FIG. 2, ($\overline{O}CD$) load line 104 is shifted upwardly to intersection point 108. This causes the tunnel diodes to switch their respective states and causes the output voltage to rise to +200 mv.

It is to be noted that when both the clock and data pulses are present, the collector potential of transistor 68 does not fall below −200 mv. For this reason, the current which is diverted when $I_a$ ceases does not flow through resistor 72, but tends to flow into node 56.

As soon as the voltage at node 56 switches from −200 mv. to +200 mv., this potential is reflected back through resistor 72 to base conductor 66 and causes transistor 60 to become slightly conductive. Since this particular status of transistor 60 is of little consequence in the operation of the circuit, no representative load line is shown in FIG. 2, however, the effect is indicated in FIG. 5 at point 175.

At $t_4$ or upon the cessation of clock pulse 172, transistor 68 becomes nonconductive and the base potential on base conductor 66 goes considerably positive thereby rendering transistor 60 more conductive. This situation is represented in FIG. 2 by intersection point 112 ($O\overline{C}D$) between load line 104 and composite curve 100.

At $t_5$, the data pulse ceases and transistor 62 becomes nonconductive thereby allowing transistor 60 to become fully conductive. This occurrence is shown in FIG. 2 by intersection point 110 ($O\overline{C}\overline{D}$) between composite curve 100 and load line 104. Upon the next occurrence of a clock pulse—$t_6$—transistor 68 is again rendered conductive allowing $I_b$ to flow, but due to the +200 mv. potential on the output line, the potential on conductor 66 does not fall as far negative as when there is a negative potential on the output line. Thus, the conduction state of transistor 60 is less affected and $I_a$ flows in practically an undisturbed manner. However, the combined current drains of $I_a$ and $I_b$ are sufficient to divert sufficient current from node 56 to cause load line 104 (FIG. 2) to shift below negative current switching level 111 of tunnel diode pair 50. Thus, the tunnel diodes revert to their low voltage output state and intersection point 101 ($\overline{O}C\overline{D}$) between load line 104 and composite curve 100 defines the present state of the trigger. When clock pulse 172 disappears, transistor 68 becomes nonconductive and load line 104 shifts up to intersection point 102 ($\overline{O}\overline{C}\overline{D}$) with composite curve 100 and a complete cycle of operation of the trigger has been completed.

While the invention has been particularly shown and described with reference to preferred embodiments thereof, it will be understood by those skilled in the art that various changes in form and details may be made therein without departing from the spirt and scope of the invention. For instance, a single tunnel diode biased for bistable operation could be substituted for the tunnel diode pairs shown in FIGS. 1 and 4. While this would create a somewhat slower circuit, the overall operation of the trigger would essentially be the same.

We claim:

1. In a trigger circuit, the combination comprising:

a bistable device adapted to provide a high voltage state in response to a first input and a low voltage state in response to a second input;

an input circuit coupled to said bistable circuit and adapted to accommodate first and second data signal levels;

a clock circuit coupled to said bistable circuit and adapted to provide timed signals;

a control circuit coupled to said clock circuit and input circuit and operatively responsive to the voltage state of said bistable device, said control circuit conditioned by a low voltage output from said bistable device to be operative, upon the simultaneous application of said first data signal level at said input circuit and a timed signal from said clock circuit to produce a first output to cause said bistable device to assume its high voltage state, said control circuit further operative when conditioned by said high voltage state from said bistable device, to respond to a timed signal from said clock circuit to produce a second output whereby said bistable device assumes its low voltage state.

2. A trigger circuit as claimed in claim 1, said bistable device comprising:

a pair of tunnel diodes connected anode to cathode.

3. In a trigger circuit, the combination comprising:

a bistable circuit for producing a high voltage in response to an input current which exceeds a first level and for producing a low voltage in response to a current less than a second level;

a current source having an output connected to said bistable circuit;

a normally conducting data input circuit connected to said bistable circuit, a data input signal being manifested by the cessation of said circuit's conducting state;

a normally nonconducting clock input circuit connected to said bistable circuit and adapted to be rendered conducting by the receipt of a clock pulse;

normally conducting unidirectional means connected between said clock input circuit and said bistable circuit and responsive to the voltage state of said bistable circuit, said unidirectional means adapted to be rendered nonconducting by the conduction of said clock input circuit when said bistable circuit is in its low voltage state, and further adapted to be conditioned by the high voltage state of said bistable circuit to remain conductive in response to the conduction of said clock input circuit;

whereby the input current flow to said bistable circuit exceeds said first level upon the simultaneously nonconduction of said data input circuit and said unidirectional means, and the current flow in said bistable circuit is less than said second level when said clock input circuit, unidirectional means, and data input circuit are simultaneously conductive.

4. A trigger circuit which comprises:

a tunnel diode pair biased for bistable operation for producing a high voltage in response to an input current exceeding a first level and a low voltage in response to a current less than a second level;

a current source, having an output connected to said tunnel diode pair;

a normally conducting data input circuit connected to said tunnel diode pair, a data input signal being manifested by the cessation of said circuit's conducting state;

a normally nonconducting clock input circuit connected to said tunnel diode pair and adapted to be rendered conducting by the receipt of a clock pulse;

a normally conducting diode connected between said clock input circuit and said tunnel diode pair, the conduction state of said diode influenced by the voltage state of said bistable circuit, said diode adapted to be rendered nonconducting by the conduction of said clock input circuit concomitantly with said tunnel diode pair being in its low voltage state, and further adapted to remain conductive when said tunnel diode pair is in its high voltage state notwithstanding the conduction of said clock input circuit;

whereby the input current flow to said tunnel diode pair exceeds said first level upon the simultaneous nonconduction of said data input circuit and said diode and the current flow in said tunnel diode pair is less than said second level only when said clock input circuit, diode and data input circuit are simultaneously conductive.

5. A circuit for storing a data signal comprising:

a current source connected to a common point;

data signal input means connected to said common point, said data signal input means normally allowing current to flow therethrough except when a data signal is to be manifested, at which time said current flow is prevented;

normally nonconducting signal translating means connected to said common point and adapted to be rendered conductive by a clock signal input;

bistable output means connected to said common point and adapted to produce a high output voltage in response to a predetermined input current and further adapted to produce a low output voltage in response to a predetermined current drain;

unidirectional conductive means connected to said common point and said signal translating means and responsive to the output produced by said bistable output means, the conduction of said signal translating means causing a voltage to be coupled to said unidirectional conductive means which is sufficient to change the normally conductive state of said unidirectional conductive means to a nonconductive state only when said bistable output means manifests its low output voltage;

said bistable output means being responsive to the current diversion thereinto created by said data signal manifestation and the nonconduction of said unidirectional conductive means to switch to its high output voltage state and further responsive to the current drain created by the combined conductions of said signal translating means, unidirectional conductive means and data signal input means to switch to its low output voltage state.

6. In a trigger circuit the combination comprising:

a tunnel diode circuit including a pair of tunnel diodes biased for bistable operation, said tunnel diode circuit adapted to produce a high voltage in response to an input current exceeding a first level and to produce a low voltage in response to an input current less than the second level;

a current source, having an output connected to said tunnel diode circuit;

a normally conducting data input circuit connected to said tunnel diode circuit, a data input signal being manifested by the cessation of said circuit's conducting state;

a normally nonconducting clock input transistor having collector, base and emitter circuits, the collector circuit being connected to said tunnel diode circuit, said clock input transistor adapted to be rendered conducting by a clock pulse input applied to its base electrode;

a normally conducting diode having an anode connected to said tunnel diode circuit and a cathode coupled to said emitter circuit of said clock input transistor, said diode adapted to be rendered nonconductive by the conduction of said clock input transistor when said tunnel diode circuit is in its low voltage state, but to remain conducting in response to the conduction of the clock input transistor when said tunnel diode circuit is in its high voltage state;

whereby the input current to said tunnel diode circuit exceeds said first level upon the simultaneous nonconductions of said data input circuit and said diode; and is less than said second level only when said clock input transistor, diode, and data input circuit are simultaneously conducting.

7. In a trigger circuit, the combination comprising:

a bistable circuit for producing a high voltage in response to an input current which exceeds a first level and for producing a low voltage in response to a current less than a second level;

a current source, having an output connected to said bistable circuit;

a normally nonconductive clock circuit adapted to be rendered conductive by the receipt of a clock pulse;

a normally nonconductive data circuit adapted to be rendered conductive by the receipt of a data signal;

a control circuit, coupling said data circuit and said clock circuit to said bistable circuit, said control circuit including a normally conductive signal translating means whose conduction state is influenced by the voltage state of said bistable circuit, said signal translating means responsive in a first instance to the simultaneous conductions of said clock circuit and said data circuit to become nonconductive and further responsive in a second instance to remain conductive when said bistable circuit manifests its high voltage state simultaneously with the conduction of said clock circuit;

whereby said control circuit in said first instance diverts sufficient current from said current source into said bistable means to exceed said first value, and in said second instance diverts sufficient current away from said bistable means to cause the total current thereinto to be less than said second value, thereby causing said bistable means in said first instance to assume its high voltage state and in said second instance its low voltage state.

8. In a trigger circuit, the combination comprising:

a bistable tunnel diode circuit for producing a high voltage in response to an input current which exceeds a first level and a low voltage in response to a current less than a second level;

a current source, having an output connected to said bistable tunnel diode circuit;

a normally nonconductive clock transistor adapted to be rendered conductive by the receipt of a clock pulse;

a normally nonconductive data transistor adapted to be rendered conductive by the receipt of a data signal;

a normally conductive control transistor having emitter, base and collector electrodes, said emitter electrode connected to said data transistor, said collector electrode directly connected to said tunnel diode circuit and connected through a resistor to the collector of said clock transistor, said base electrode connected to the collector of said clock transistor, said control transistor responsive in a first instance to the simultaneous conductions of said clock transistor and said data transistor to become nonconductive and further responsive in a second instance to remain conductive when said bistable tunnel diode circuit manifests its high voltage state simultaneously with the conduction of said clock transistor;

whereby said control transistor in said first instance diverts sufficient current from said current source into said bistable tunnel diode circuit to exceed said first value, and in said second instance diverts sufficient current away from said bistable tunnel diode circuit to cause the total current therein to be less than said second value, thereby causing said bistable tunnel diode circuit in said first instance to assume its high voltage state and in said second instance its low voltage state.

References Cited by the Examiner

UNITED STATES PATENTS 3,091,737 5/63 Tellerman et al. ---------- 328—72

OTHER REFERENCES

IBM Technical Disclosure Bulletin, "Transistor Tunnel Diode Bistable Trigger," F. K. Buelow et al., vol. 4, No. 12, May 1962, page 78.

JOHN W. HUCKERT, *Primary Examiner.*

ARTHUR GAUSS, *Examiner.*